(12) United States Patent
Ozawa et al.

(10) Patent No.: US 7,842,202 B2
(45) Date of Patent: Nov. 30, 2010

(54) PRODUCTION METHOD AND PRODUCTION APPARATUS OF OPTICAL DISC

(75) Inventors: Naoto Ozawa, Tokyo (JP); Masahiro Nakamura, Saitama (JP); Takayuki Suzuki, Yachiyo (JP)

(73) Assignee: Origin Electric Company Limited, Tokyo (JP)

( * ) Notice: Subject to any disclaimer, the term of this patent is extended or adjusted under 35 U.S.C. 154(b) by 0 days.

(21) Appl. No.: 12/087,232

(22) PCT Filed: Dec. 27, 2006

(86) PCT No.: PCT/JP2006/326103

§ 371 (c)(1),
(2), (4) Date: Jun. 27, 2008

(87) PCT Pub. No.: WO2007/077885

PCT Pub. Date: Jul. 12, 2007

(65) Prior Publication Data

US 2009/0040913 A1 Feb. 12, 2009

(30) Foreign Application Priority Data

Dec. 28, 2005 (JP) .............................. 2005-380469

(51) Int. Cl.
*G11B 7/26* (2006.01)
(52) U.S. Cl. ........................ 264/2.1; 264/1.33; 264/2.7; 425/402; 425/810; 118/52
(58) Field of Classification Search ................ 264/1.33, 264/2.1, 2.6, 2.7; 425/383, 402, 810; 118/52
See application file for complete search history.

(56) References Cited

U.S. PATENT DOCUMENTS

2003/0102582 A1 * 6/2003 Suzuki et al. .............. 264/1.33

(Continued)

FOREIGN PATENT DOCUMENTS

JP 04-322768 * 9/1992

(Continued)

OTHER PUBLICATIONS

International Search Report of PCT/JP2006/326103 dated Apr. 10, 2007.

*Primary Examiner*—Joseph S Del Sole
*Assistant Examiner*—Robert Dye
(74) *Attorney, Agent, or Firm*—Kenyon & Kenyon LLP

(57) ABSTRACT

In order to control a warp of a disc substrate so as to be a desired level, an optical disc production method includes: a step of supplying resin on the disc substrate; a step of mounting the disc substrate on an inside diameter portion of a turntable after supplying the resin; a step of providing an air-gap between an outside diameter portion of the turntable and a portion of the disc substrate that is not mounted; a step of extending the resin by spinning; and a curing step of curing the resin while spinning the disc substrate mounted on the inside diameter portion of the turntable, wherein in the step of extending the resin, a negative pressure is affected on a portion of the disc substrate that is not mounted, and in the curing step, the warp is controlled by curing the resin on the spinning disc substrate while maintaining effect of the negative pressure.

4 Claims, 10 Drawing Sheets

U.S. PATENT DOCUMENTS

| | | | |
|---|---|---|---|
| 2004/0212116 A1* | 10/2004 | Suzuki et al. | 264/40.1 |
| 2005/0001343 A1* | 1/2005 | Komaki et al. | 264/1.33 |
| 2006/0198981 A1* | 9/2006 | Murata et al. | 428/64.4 |
| 2007/0006804 A1* | 1/2007 | Kang et al. | 118/52 |

FOREIGN PATENT DOCUMENTS

| | | | |
|---|---|---|---|
| JP | 4-322768 | | 11/1992 |
| JP | 9-147430 | | 6/1997 |
| JP | 1997-161239 | * | 6/1997 |
| JP | 11-316982 | * | 9/1999 |
| JP | 11-316982 | | 11/1999 |
| JP | 2001-256683 | | 9/2001 |
| JP | 2002-251803 | | 9/2002 |
| JP | 2002-260301 | | 9/2002 |
| JP | 2002-319192 | | 10/2002 |
| JP | 2003-99985 | | 4/2003 |
| JP | 2004-280927 | | 10/2004 |
| JP | 2005-056503 | | 3/2005 |
| JP | 2005-141799 | * | 6/2005 |
| JP | 2005-174375 | | 6/2005 |
| JP | EP1609537 | * | 6/2005 |
| JP | 2005-285280 | | 10/2005 |

* cited by examiner

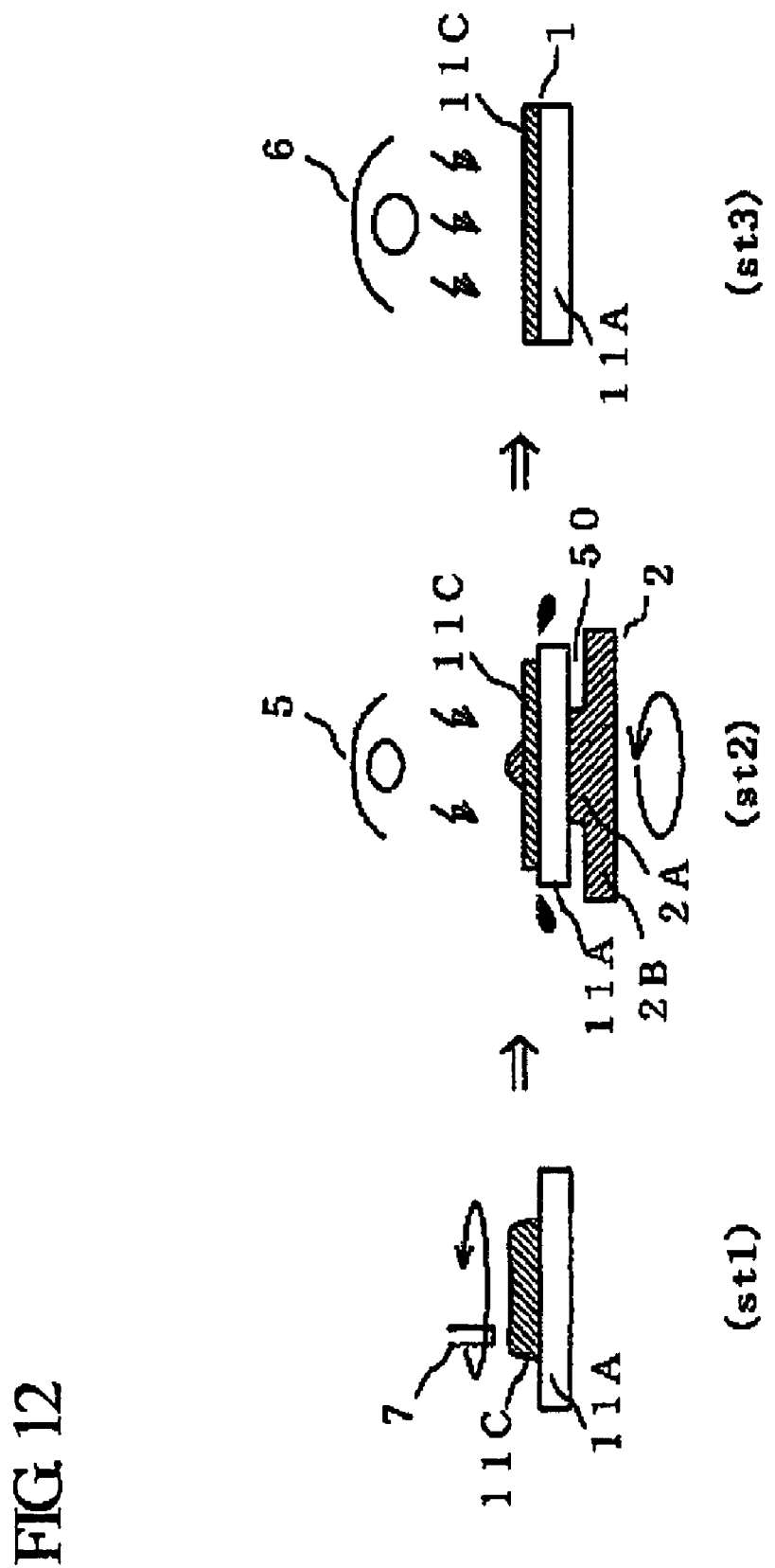

PRODUCTION METHOD AND PRODUCTION APPARATUS OF OPTICAL DISC

TECHNICAL FIELD

The present invention relates to a production method and a production apparatus of an optical disc that control the warp or the curve of the optical disc so as to be smaller than a desirable or predetermined value.

Priority is claimed on Japanese Patent Application No. 2005-380469, filed Dec. 28, 2005, the content of which is incorporated herein by reference.

BACKGROUND ART

An optical disc has been developed from a CD (compact disc) and a DVD (digital versatile disc) to a next generation high-density disc, and the recording density or packing density of the optical disc has been increasing. Data on the optical disc is recorded by, for example, forming very fine patterns or grooves on a surface of a substrate made from polycarbonate, and the recorded data is read by scanning the patterns or grooves with a laser beam. In order to improve the recording density, an optical disc with multiple recording surfaces on a single disc has been produced. Such an optical disc is produced by adhering two or more disc substrates having a recording surface by using a resin as an adhesive.

In a case of adhering two or more disc substrates by using the resin as the adhesive, in general, first, the adhesive is supplied on an area close to the center of one of the disc substrates so as to be a circular shape, second, the disc substrates are being spun after combination with other disc substrates, and third, the resin between the disc substrates is spun off by extending the excessive adhesive in order to obtain a film of the resin which is evenly spread on an overall surface of the disc substrate with a uniform thickness, After the above-described steps, the optical disc including two or more combined disc substrates is transported to an ultraviolet radiation apparatus in order to cure the overall extended adhesive.

Regarding a single disc substrate before combination with other disc substrates, it is known that a warp or a curve may be caused when the substrate is formed by using a metal mold and when the disc substrate is taken out of the metal mold, a warp or a curve may be caused in a step of transporting the disc substrate by using a transportation mechanism, and the warp or curve of the disc substrate may be maintained by curing or hardening the disc substrate in such a state. If the disc substrates which respectively have a warp or curve are combined, the disc substrate obtained by combining such disc substrates has a warp or curve.

When the adhesive between the combined disc substrates is cured, because of the influence of heat caused by light radiated from an ultraviolet radiation apparatus, and because of the influence of such differences of transmittance caused by differences of materials and/or constitution of films formed on the disc substrate, there is a possibility of causing a temperature difference between an upper side substrate of the combined disc substrates on which the light is radiated and a lower side substrate of the combined disc substrates which touches a mounting table. In addition, both a heat included in the radiated light and the heat of reaction of the adhesive which is an ultraviolet curable resin is conducted to a mounting table, a temperature of the mounting table is raised, and consequently, a temperature difference can be caused between an upper side substrate of the combined disc substrates on which the light is radiated and a lower side substrate of the combined disc substrates which touches the mounting table. In general, an upper side substrate is largely extended by the influence of a large amount of heat compared to a lower side substrate which is less extended by the influence of the small amount of heat. If the adhesive is cured in such a state, after cooling of the substrate, the upper side substrate has a larger shrinkage compared to the lower side substrate, and the overall disc substrate is in a curved shape dipping at a center portion.

There is a generally-known technique for controlling such a curve or warp, that is disclosed in, for example, Patent Document 1. In Patent Document 1, a mounting table on which the substrate is mounted provides a cooling portion for preventing the mounting table from increasing the temperature and keeping the mounting table at a predetermined temperature, and the temperature difference between an upper side substrate and a lower side substrate is controlled to be small in order to prevent the substrate from having a warp or curve. On the other hand, in Patent Document 2, the amount of warp or curve of the substrate after radiating ultraviolet light is measured beforehand, a temperature difference between the upper side substrate and the lower side substrate is caused by a heating means based on the measured amount of warp or curve before radiating ultraviolet light, and consequently, the warp or curve of the substrate is controlled.

In accordance with such conventional control methods using phenomena of being curved by heat, it is possible to control the overall shape of the substrate so as to be raising or dipping with an axis or center that is the central aperture of the substrate. However, it is difficult to control a partial warp or curve by controlling the temperature of a corresponding portion because the heat is conducted in the substrate. In particular, in a case in which the substrate includes a partial warp or curve at the outside edges after molding, there is a possibility of including a warp or curve in the combined substrate at the outside edge, and it has been desired to reduce such a partial warp or curve. The present invention has been conceived in order to solve such a problem and has an objective to automatically control the warp or curve to be in a desirable state.

[Patent Document 1] Japanese Patent Application, First Publication No. 2003-99985

[Patent Document 2] Japanese Patent Application, First Publication No. 2002-251803

DISCLOSURE OF INVENTION

A first aspect of the present invention is an optical disc production apparatus including: a turntable spinning a first disc substrate on which a liquid material is supplied in order to spread the liquid material; and a first curing portion which semi-cures or completely cures the liquid material while spinning the first disc substrate, wherein the turntable includes: an inside diameter member which mounts a portion of the first disc substrate; and an outside diameter member which faces the first disc substrate mounted on the inside diameter member and which includes an air-gap between the outside diameter member and the portion of the first disc substrate that is not mounted.

In accordance with the above-described first aspect, on the first disc substrate, a negative pressure generated by the spin causes a force in an opposite direction compared to the direction of a warp or curve, the resin (liquid material) extended on the first disc substrate is cured in such a state, and consequently, it is possible to control the warp or curve so as to be in a desired or predetermined value.

A second aspect of the present invention is the above-described optical disc production apparatus wherein the mounted portion of the first disc substrate is close to a center aperture of the first disc substrate.

In accordance with the above-described second aspect, it is possible to effectively use the force in an opposite direction compared to the warp or curve of the first disc substrate caused by the negative pressure which is caused by spinning the first disc substrate.

A third aspect of the present invention is the above-described optical disc production apparatus wherein the air-gap is 0.2 mm or smaller and is larger than 0 mm.

In accordance with the above-described third aspect, it is possible to control the warp or curve to be in an appropriate or preferable range.

A fourth aspect of the present invention is the above-described optical disc production apparatus further including a driving portion which moves the inside diameter member of the turntable upward/downward.

In accordance with the above-described fourth aspect, by controlling the rising and/or falling operation of the inside diameter member of the turntable, it is possible to automatically adjust a size of an air-gap or slit without difficulties.

A fifth aspect of the present invention is the above-described optical disc production apparatus wherein the inside diameter member comprises one or more thin platy member which are combined and put on the outside diameter member.

In accordance with the above-described fifth aspect, by using a member which has the shape of a thin plate as the inside diameter member of the turntable, it is possible to adjust the size of an air-gap or slit by applying a simple constitution without difficulties.

A sixth aspect of the present invention is the above-described optical disc production apparatus further including an apparatus which mounts and combines a second disc substrate concentrically on the liquid material supplied on the first disc substrate.

In accordance with the above-described sixth aspect, on the first and second disc substrates which are combined, a negative pressure generated by the spin causes a force in the opposite direction compared to the direction of warp or curve, the resin extended between the disc substrates is cured in such a state, and consequently, it is possible to control the warp or curve to be a desired or predetermined value.

A seventh aspect of the present invention is the above-described optical disc production apparatus further including a second curing portion which completely cures the liquid material after being semi-cured by the first curing portion.

In accordance with the above-described seventh aspect, because the second curing portion is provided, it is possible to conduct a curing operation twice, and it is possible to use small units for each of the curing operations. In addition, it is possible to disperse radiation energy and to reduce the warp or curve caused by radiation.

An eighth aspect of the present invention is an optical disc production method including steps of: mounting a portion of a disc substrate on a turntable while maintaining an air-gap between an outside diameter portion of the turntable and the portion of the disc substrate that is not mounted on the inside diameter portion after supplying liquid material on the disc substrate; spinning the first disc substrate in order to spread the liquid material; and semi-curing or completely curing the liquid material while spinning the first disc substrate.

In accordance with the above-described eighth aspect, on the disc substrate, a negative pressure generated by the spin causes a force in an opposite direction compared to the direction of a warp or a curve, the resin (liquid material) extended on the disc substrate is cured in such a state, and consequently, it is possible to control the warp or curve to be a desired or predetermined value.

A ninth aspect of the present invention is the above-described optical disc production method wherein the warp of the first disc substrate is controlled by adjusting the size of the air-gap.

In accordance with the above-described ninth aspect, on the disc substrate, negative pressure generated by the spin causes a force in a direction opposite to the direction of a warp or a curve, and it is possible to control the warp or curve to be in a predetermined or desirable range by setting the size of the air-gap at a predetermined value.

A tenth aspect of the present invention is the above-described optical disc production method wherein the warp of the first disc substrate is controlled by adjusting the spinning speed of the turntable.

In accordance with the above-described tenth aspect, on the disc substrate, a negative pressure generated by the spin causes a force in a direction opposite to the direction of a warp or a curve, and it is possible to control the warp or curve to be in a predetermined or desirable range by setting the speed of revolution of the turntable at a predetermined value.

An eleventh aspect of the present invention is the above-described optical disc production method further including steps of measuring warp of the disc substrate after curing the liquid material, wherein the size of an air-gap is adjusted based on a measured result of the warp.

In accordance with the above-described eleventh aspect, warp or curve of optical discs is measured after producing through a series of production steps, and it is possible to optimize the size of the air-gap by an automatic controlling operation based on the measured data, and consequently, it is possible to control the warp or curve to be in a predetermined range without difficulties.

A twelfth aspect of the present invention is the above-described optical disc production method further including steps of measuring the warp of the disc substrate after curing the liquid material, wherein a spinning speed of the turntable is adjusted based on a measured result of the warp.

In accordance with the above-described twelfth aspect, warp or curve of optical discs are measured after production through a series of production steps, and it is possible to optimize the speed of revolution of the turntable by an automatic controlling operation based on the measured data, and consequently, it is possible to control the warp or curve so as to be in a predetermined range without difficulties.

In addition, the present invention preferably provides the following aspects.

Another aspect of the present invention is an optical disc production method characterized by comprising: a step of applying a resin to a first disc substrate; a step of mounting the first disc substrate on which the resin has been supplied onto an inside diameter portion of a turntable, providing an air-gap between an outside diameter portion of the turntable and the portion which is not mounted of the first disc substrate and extending the resin by spinning; and a first curing step of curing the resin while spinning the first disc substrate which is mounted on the inside diameter portion of the turntable, wherein a negative pressure is applied on the portion of the first disc substrate which is not mounted while spinning at the step of extending the resin, and the amount of warp and/or curve is controlled by curing the resin on the spinning first disc substrate while the negative pressure is being applied in the first curing step.

In accordance with the above-described aspect, on the first disc substrate, a negative pressure generated by the spin causes a force in a direction opposite to a direction of a warp or a curve, the resin extended on the first disc substrate is cured in such a state, and consequently, it is possible to control the warp or curve to be a desired or predetermined value.

Another aspect of the present invention is the above-described optical disc production method characterized by further including a step of mounting and combining a second disc substrate concentrically on the liquid material supplied on the first disc substrate.

In accordance with the above-described aspect, on the first and second disc substrates which are combined, a negative pressure generated by the spin causes a force in a direction opposite to a direction of a warp or a curve, the resin extended between the disc substrates is cured in such a state, and consequently, it is possible to control the warp or curve to be a desired or predetermined value.

Another aspect of the present invention is the above-described optical disc production method characterized by further including a second curing step in which the liquid material is completely cured after being semi-cured in the first curing step.

In accordance with the above-described aspect, because the second curing step is provided, it is possible to conduct a curing operation twice, and it is possible to use small units for each of the curing operations. In addition, it is possible to disperse radiation energy and to reduce warp or curve caused by radiation.

Another aspect of the present invention is the above-described optical disc production method characterized by controlling the warp of the disc substrate by adjusting the size of an air-gap.

In accordance with the above-described aspect, on the first disc substrate, a negative pressure generated by the spin causes a force in a direction opposite to a direction of a warp or a curve, and it is possible to control the warp or curve so as to be in a predetermined or desirable range by setting the size of the air-gap to a predetermined value.

Another aspect of the present invention is the above-described optical disc production method characterized by controlling the warp of the disc substrate by adjusting the spinning speed of the turntable.

In accordance with the above-described aspect, on the first disc substrate, a negative pressure generated by the spin causes a force in a direction opposite to the direction of a warp or a curve, and it is possible to control the warp or curve so as to be in a predetermined or desirable range by setting the speed of revolution of the turntable at a predetermined value.

Another aspect of the present invention is the above-described optical disc production method characterized by including a step of measuring the warp of the first disc substrate after curing the liquid material, wherein the negative pressure is adjusted based on the measured result of the warp.

In accordance with the above-described aspect, warp or curve of optical discs is measured after production through a series of production steps, and it is possible to optimize the size of the air-gap or the speed of revolution of the turntable by an automatic controlling operation based on the measured data, and consequently, it is possible to control the warp or curve to be in a predetermined range without difficulties.

Another aspect of the present invention is the above-described optical disc production method characterized by including a step of measuring warp of the first and second disc substrates after curing the liquid material, wherein the negative pressure is adjusted based on the measured result of the warp.

In accordance with the above-described aspect, warp or curve of optical discs are measured after production through a series of production steps, and it is possible to optimize the size of the air-gap or the speed of revolution of the turntable by an automatic controlling operation based on the measured data, and consequently, it is possible to control the warp or curve to be in a predetermined range without difficulties.

Another aspect of the present invention is the above-described optical disc production method characterized by conducting a curing operation on the resin continuously in a direction from an inside peripheral to an outside peripheral of the disc substrate.

In accordance with the above-described aspect, curing operation on the resin is conducted continuously in a direction from an inside peripheral to an outside peripheral of the disc substrate before spreading more than a necessary amount of the resin in a radial and outside direction, and consequently, not only control of the warp or curve, but also control of the thickness can be conducted in order to obtain a desirable thickness of the film. Therefore, it is possible to obtain a uniform thickness of both the inside peripheral and the outside peripheral.

Another aspect of the present invention is an optical disc production apparatus including: a resin supplying unit applying a resin to a first disc substrate; a turn table which includes both an inside diameter portion mounting the first disc substrate and an outside diameter portion facing the disc substrate, which provides an air-gap between the outside diameter portion and the inside diameter portion and which extends the resin by spinning; a spinning driving apparatus controlling spinning of the turntable; a first curing unit curing the resin while spinning the first disc substrate, wherein a negative pressure is applied on the portion of the first disc substrate which is not mounted while spinning, and an amount of warp and/or curve is controlled while curing the resin on the spinning fast disc substrate by the first curing unit.

In accordance with the above-described aspect, a negative pressure generated by the spin causes a force in a direction opposite to a direction of a warp or a curve, the resin extended on the first disc substrate is cured in such a state, and consequently, it is possible to control the warp or curve to be in a predetermined or desirable range.

Another aspect of the present invention is the above-described optical disc production apparatus further including a combining apparatus which mounts and combines a second disc substrate concentrically on the liquid material supplied on the first disc substrate.

In accordance with the above-described aspect, on the combined first and second disc substrates, a force is generated in a direction opposite to a direction of a warp or a curve, the resin extended on the disc substrate is cured in such a state, and consequently, it is possible to control the warp or curve to be in a predetermined or desirable range.

Another aspect of the present invention is the above-described optical disc production apparatus further including a second curing unit which completely cures the liquid material after semi-curing by the first curing unit.

In accordance with the above-described aspect, became the second curing unit is provided, it is possible to conduct a curing operation twice, and it is possible to use small units for each of the curing operations. In addition, it is possible to disperse radiation energy and to reduce a warp or curve caused by radiation.

Another aspect of the present invention is the above-described optical disc production apparatus characterized by further including a driving portion which moves the inside diameter member of the turntable upward/downward in order to adjust a size of the air-gap.

In accordance with the above-described aspect, by controlling the rising and/or falling operation of the inside diameter member of the turntable, it is possible to automatically adjust a size of a air-gap or slit without difficulties.

Another aspect of the present invention is the above-described optical disc production apparatus in which the inside diameter member comprises one or more thin platy members which are combined and put on the outside diameter member, and in which the size of the air-gap is adjusted by modifying the thickness of the thin platy members.

In accordance with the above-described aspect, by using a member which has a shape of a thin plate as the inside diameter member of the turntable, it is possible to adjust the size of an air-gap or slit by applying a simple constitution without difficulties.

BRIEF DESCRIPTION OF THE DRAWINGS

FIG. 12 is a drawing explaining a step of forming a film such as a protection layer.

DESCRIPTION OF THE REFERENCE SYMBOLS

Figure 1:
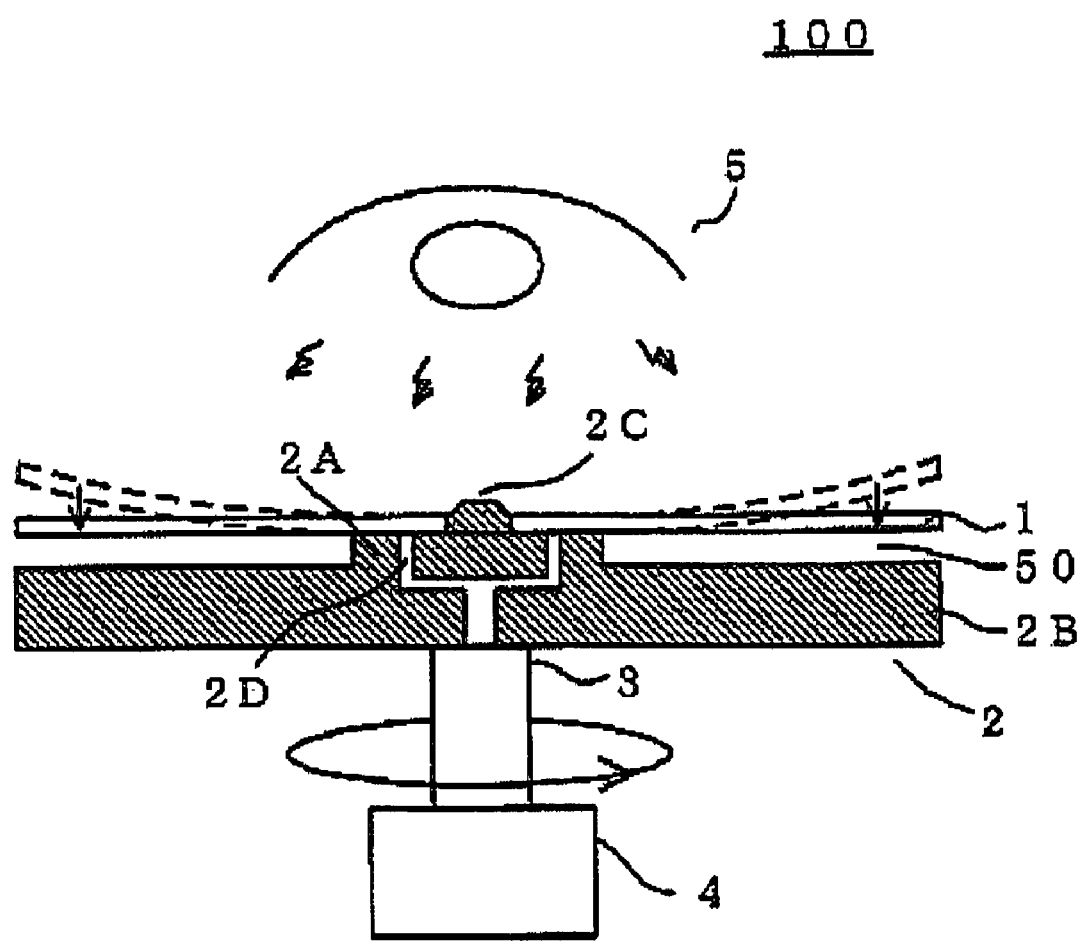
FIG. 1 is a drawing for explaining a spinning apparatus of a first embodiment of the present invention.

1 . . . (combined) disc substrate
1A, 11A . . . first disc substrate
1B . . . second disc substrate
1C . . . adhesive
2, 22 . . . turntable
2A, 22A . . . inside diameter member
2B, 22B . . . outside diameter member
2C, 22C . . . pin shape member
2D, 22D . . . suction aperture
3 . . . spinning axis
4 . . . spin driving apparatus
5 . . . first ultraviolet radiation apparatus
6 . . . second ultraviolet radiation apparatus
7 . . . nozzle of resin supplying apparatus
8 . . . inspection apparatus
9 . . . turntable control apparatus
9A . . . air-gap control portion
9B . . . spin control portion
10 . . . spot ultraviolet radiation apparatus
11C . . . resin
13, 19 . . . turntable
13A, 19A . . . mounting portion
14 . . . turn over apparatus
15 . . . resin supplying apparatus
16 . . . combining apparatus
17, 18, 21 . . . transport arm
30 . . . ultraviolet source
31 . . . radiation control apparatus
40 . . . gas discharging unit
50 . . . air-gap
100, 200, 300, 400 . . . spinning apparatus
500 . . . optical disc production apparatus

BEST MODE FOR CARRYING OUT THE INVENTION

Hereinafter, in reference to the drawings, embodiments of the present invention are explained. It should be noted that, among the drawings, the same reference numeral is assigned to the same or corresponding devices, and duplicated explanations are omitted. In addition, the following embodiments are not limitations of the present invention, and for example, it is possible to combine constitutional elements of the following embodiments.

First Embodiment

FIG. 1 shows a spinning apparatus 100 that reduces the amount of warp or curve of a disc substrate 1 obtained by combining a pair of disc substrates by using a resin, that is, an adhesive. A turntable 2 is mainly constituted from an inside diameter member 2A and an outside diameter member 2B which has a larger diameter than the inside diameter member 2A. A reference numeral 2C indicates a pin shape member which pierces a center hole of the disc substrate 1 which is obtained by combining disc substrates, and the pin shape member 2C is formed at a center portion of the inside diameter member 2A. In addition, the turntable 2 is connected to a spin driving apparatus 4 via a spinning axis 3. On a surface of the inside diameter member 2A, multiple suction apertures 2D are provided in order to fix the disc substrate 1 which is obtained by combining disc substrates. The suction apertures 2D are connected to a vacuum source which is not shown in the drawings via the spinning axis 3 by using such as a labyrinth seal. Above the turntable 2, in order to semi-cure or completely cure an adhesive layer applied to the disc substrate 1 which is obtained by combining the disc substrates, an ultraviolet radiation apparatus 5 which is a first curing unit is provided.

Here, a diameter of the inside diameter member 2A is smaller than a diameter of the disc substrate 1 and mounts at least an area close to a center aperture of the disc substrate 1. However, in a case of adjusting warps or curves close to an outside periphery of the disc substrate 1, it is possible that the inside diameter member 2A mount an area close to the outside periphery of the disc substrate 1. For example, in a case of a disc substrate which has a radius of 60 mm, a radius from the center of the area which is mounted by the inside diameter member 2A is in a range of 40 mm or smaller, preferably 30 mm or smaller and further preferably 20-25 mm, that is, inside an area on which no data is recorded. Such an area is included in a range of a ratio, that is, a ratio of a radius compared to the disc substrate, of approximately 67%. The outside diameter member 2B has a diameter which is almost the same or more than a diameter of the disc substrate 1. A mounting area of the inside diameter member 2A is set at a higher position than an upside surface of the outside diameter member 2B, and when the disc substrate 1 is mounted on the inside diameter member 2A, an air-gap 50 is formed between a mounted side of the disc substrate 1 and the outside diameter member 2.

Figure 2:
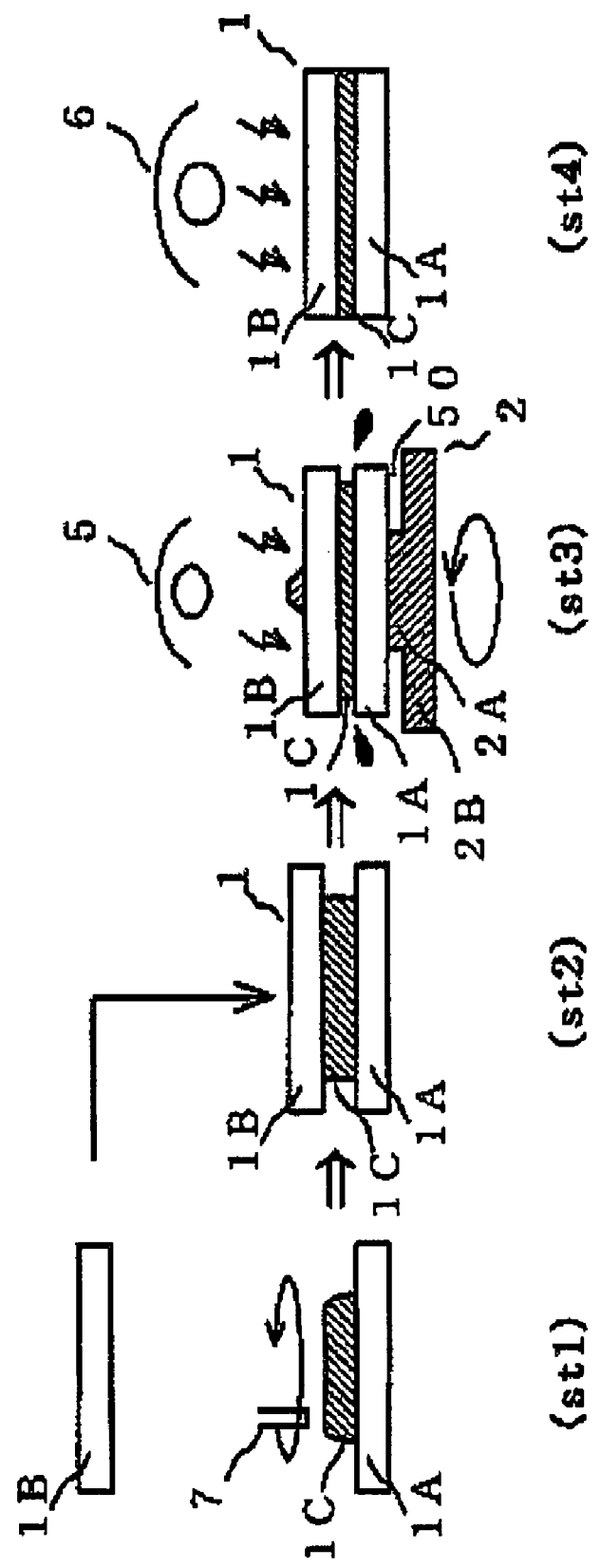
FIG. 2 is a drawing for explaining a binding step of disc substrates.

Next, operations are explained in reference to FIG. 2. There are a first disc substrate 1A (hereinafter, disc substrate 1A) and a second disc substrate 1B (hereinafter, disc substrate 1B), the disc substrate 1A is set in a manner in which a surface of the disc substrate 1A which is combined faces above, and an adhesive 1C is supplied on the surface outside a center aperture so as to be a circular shape via a nozzle 7 of a resin supplying apparatus (st1). It should be noted that the circular shape can be discontinuous, that is, the circular shape includes a case of discontinuously supplying the adhesive. In this embodiment, an ultraviolet-curable resin is used as the adhesive 1C. However, it is possible to use other resins.

The disc substrate 1B is set on the disc substrate 1A so as to be concentric after putting the adhesive 1C on the disc substrate 1B (st2). The disc substrate 1B has the same shape as the disc substrate 1A. Here, it is preferable to combine the disc substrate 1B on the disc substrate 1A while applying a voltage between the disc substrate 1B and the disc substrate 1A because it is possible to avoid including bubbles. The voltage can be AC or DC.

The disc substrate 1 obtained by combining the disc substrates 1A and 1B is transported to the turntable 2 of the spinning apparatus 100 and is mounted on the inside diameter member 2A of the turntable 2 (st3). In general, every time, a direction of warp or curve of the combined disc substrate 1 appears almost the same, if no condition is changed such as forming conditions of the disc substrates 1A and 1B before combining, conditions of transporting, and the like. For example, if both the disc substrates 1A and 1B are in a shape which has a dipping curve and are combined, the disc substrate 1 after combining is in a shape which has a dipping curve as shown by broken lines of FIG. 1. In addition, if one of the disc substrates 1A and 1B is in a shape which has a dipping curve and both the substrates are combined, there is a possibility in which the disc substrate 1 after combining is in a shape which has a dipping curve. In view of such cases, it is possible to arrange the combined disc substrates 1A and 1B beforehand so as to have a direction of warp which forms a dipping curve when being mounted on the inside diameter member 2A of the turntable 2. For example, it is possible to turnover the disc substrate 1A or 1B if necessary based on a detecting result of a direction of warp or curve before mounting on the turntable 2.

The outside diameter member 2B of the turntable 2 has a larger diameter than the inside diameter member 2A, and when the combined disc substrates 1A/1B are mounted on the inside diameter member 2A, an air-gap 50 is formed between a portion of the combined disc substrates 1A/1B that is not mounted and the outside diameter member 2B. In such a condition, the combined disc substrates 1A/1B are mounted on the turntable 2 to which the spin driving apparatus 4 is connected via the spinning axis 3 and are spun at a high speed (st3). The combined disc substrates 1A/1B are spun at a high speed, and consequently, the adhesive between the combined disc substrates 1A/1B is extended in a direction from an inside edge to an outside edge. Here, when the combined disc substrates 1A/1B are spun at a high speed, as shown in FIG. 1, a negative pressure is generated under a surface of the combined disc substrates 1A/1B which is not mounted, and a force is generated that pulls the disc substrate downward. It is possible to control such a negative pressure based on a size of the air-gap 50, a spinning speed, and the like. A force is caused on the combined disc substrates 1A/1B in a contrary direction compared to a direction or warp or curve shown by broken lines in FIG. 1, hence, by setting a size of the air-gap and/or the spinning speed at a predetermined value, it is possible to adjust the warp or curve and achieve a flat state shown with a solid line of FIG. 1 without warp and curve.

Here, a size of the air-gap is a distance between an upper surface of the outside diameter member 2B and a lower side surface of the combined disc substrates 1A/1B in a state without warp and curve. Therefore, a size of the air-gap is determined based on a height of the inside diameter member 2A, and the height of the inside diameter member 2A is 5 mm or smaller in this embodiment and is preferably in a range of 1 mm or smaller. The spinning speed is, for example, in a range of 600-10000 rpm.

Next, in a state in which a downward force is being applied to the combined disc substrates 1A/1B while spinning at a high speed, the first ultraviolet radiation apparatus 5 radiates ultraviolet on the disc substrate 1, and the adhesive 1C is semi-cured or completely cured. The adhesive is semi-cured or completely cured, hence, the disc substrates 1A and 1B are temporally fixed while keeping the warp or curve at a small range or at a desired level. In accordance with such a manner, the adhesive extended between the disc substrates 1A and 1B is semi-cured or completely cured while a force is being applied on the combined disc substrates 1A/1B in a contrary direction compared to a direction of warp or curve, and as a result, it is possible to obtain the disc substrate 1 which is maintained in a state in which warp and curve are reduced. In addition, by controlling or adjusting a size of the air-gap and the spinning speed, it is possible to control the warp and curve so as to be a desired level. For example, it is possible to control or adjust warp and curve so as to be in a range between a state shown with broken lines and a state shown with solid lines of FIG. 1, so as to be a flat state shown with solid lines of FIG. 1 and so as to have a warp or curve in a direction to the turntable 2. In addition, in accordance with the above-described method, a uniform force is applied on the overall surface of the disc substrate because the disc substrate is being spun, and it is possible to remove warp and curve which are partially caused, hence, it is possible to obtain a flat disc substrate with a desired level of warp or curve.

A second ultraviolet radiation apparatus 6 which is a curing unit radiates ultraviolet on an overall surface of the combined disc substrates 1A/1B after reducing warp and curve or adjusting warp and curve so as to be a desired level, and the adhesive 1C is completely cured (st4). It should be noted that if the adhesive 1C has been completely cured by the ultraviolet radiation apparatus 5 in Step st3, it is possible to omit radiation of ultraviolet of the second radiation step of Step st4. It is possible to divide a curing step into two portions by providing the ultraviolet radiation apparatus 5, and it is possible to use comparatively small curing units for two curing steps. There is another solution in which the second ultraviolet radiation apparatus 6 is omitted. In addition it is possible to diffract radiation energy, and consequently, it is possible to avoid warp and curve caused by radiation.

Figure 3:
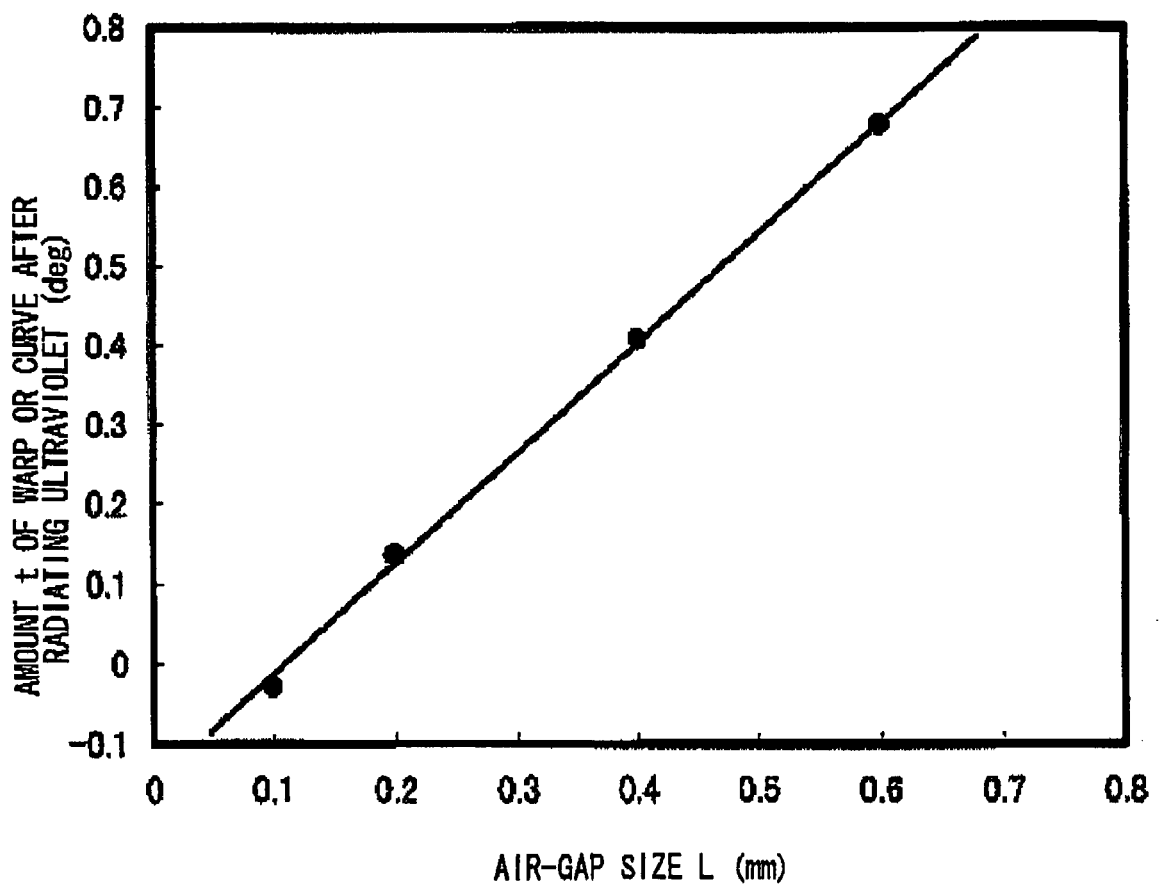
FIG. 3 is a graph which shows both the size of an air-gap or slit of a spinning apparatus and the amount of warp or curve after radiating ultraviolet.

FIG. 3 shows a relationship between an air-gap size L and warp amount t after radiating ultraviolet. A spinning speed is uniform. The relationship between the air-gap size L and the warp amount t is proportional, and it is possible to control or adjust warp and curve so as to be a desired level by setting the air-gap size L at a predetermined value. The relationship between the air-gap size L and the warp amount t is "t=K× L+a" when a slope of this relationship is "K". Here, after calculating "t" as a value of warp or curve after radiating ultraviolet in a condition in which the air-gap size L is zero, it is possible to calculate a constant value "a" based on "t". Based on this formula of the relationship, it is possible to calculate the most preferable value of the air-gap size L in order to obtain the predetermined warp "t". In addition, it is preferable to calculate values used in this formula with regard to predetermined cases of different spinning speeds beforehand, and it is possible to automatically control or adjust warp and curve of a final step based on this formula.

Second Embodiment

Figure 4:
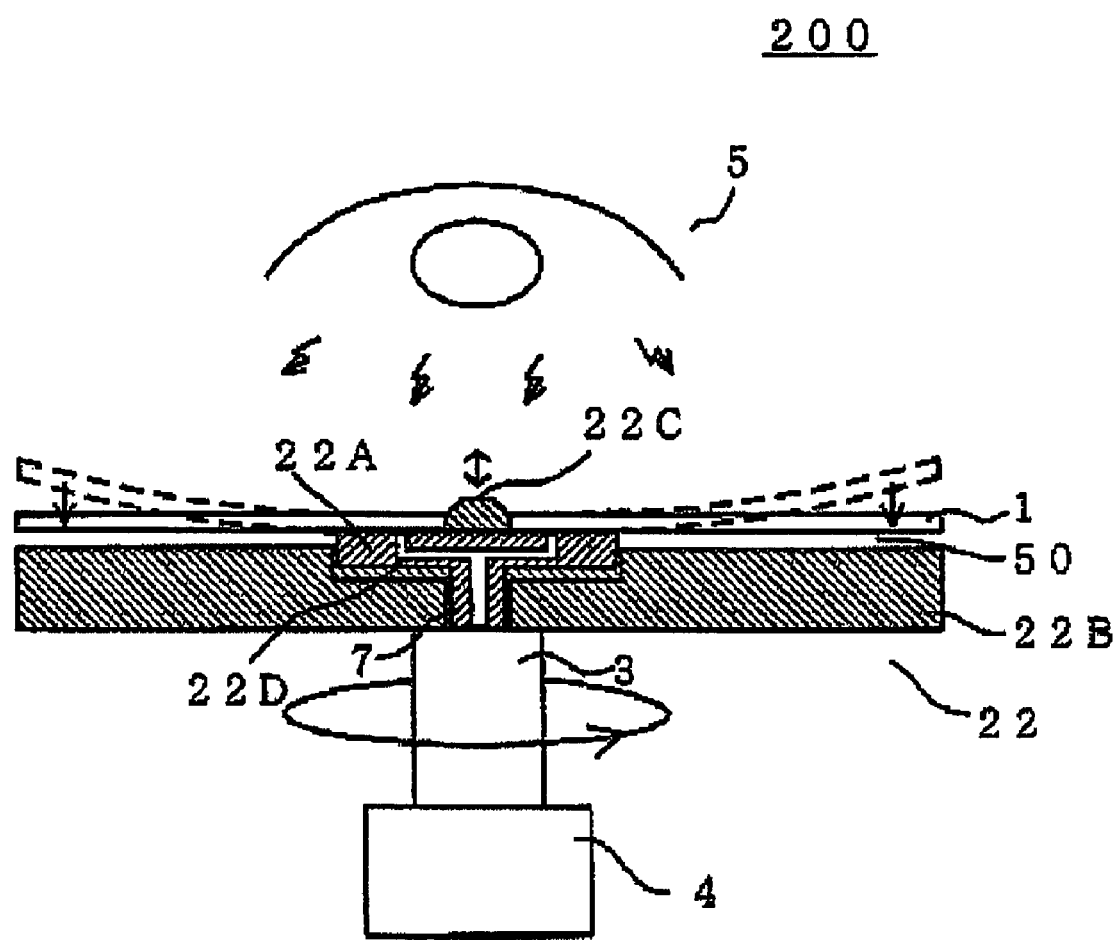
FIG. 4 is a drawing which explains the constitution of a spinning apparatus of a second embodiment of the present invention.

In reference to FIG. 4, a spinning apparatus 200 is explained which is another example of the spinning apparatus 100 that is explained above in the first embodiment. In this embodiment a turntable 22 is different from the first embodiment. The turntable 22 is mainly constituted from an inside diameter member 22A, an outside diameter member 22B and a pin shape member 22C, and in this constitution, other than a spinning operation, it is possible to move the inside diameter member 22A upward and downward by using an upward/downward driving apparatus such as a cylinder apparatus connected to an upward/downward driving axis 7 that is not shown in the drawings. Therefore, a gap between a mounting surface of the inside diameter member 22A and an upper surface of the outside diameter member 22B is adjusted by moving up or down the inside diameter member 22A, hence, it is possible to adjust or control a size of an air-gap between an upper surface of the outside diameter member 22B and a lower side surface of the combined disc substrates 1A/1B mounted on the inside diameter member 22A without difficulties. Both the inside diameter member 22A and the outside diameter member 22B of the turntable 22 integrally spin. The same as the first embodiment, on a surface of the inside diameter member 22A, multiple suction apertures 22D are provided in order to fix the disc substrate 1 which is obtained by combining disc substrates.

Figure 5:
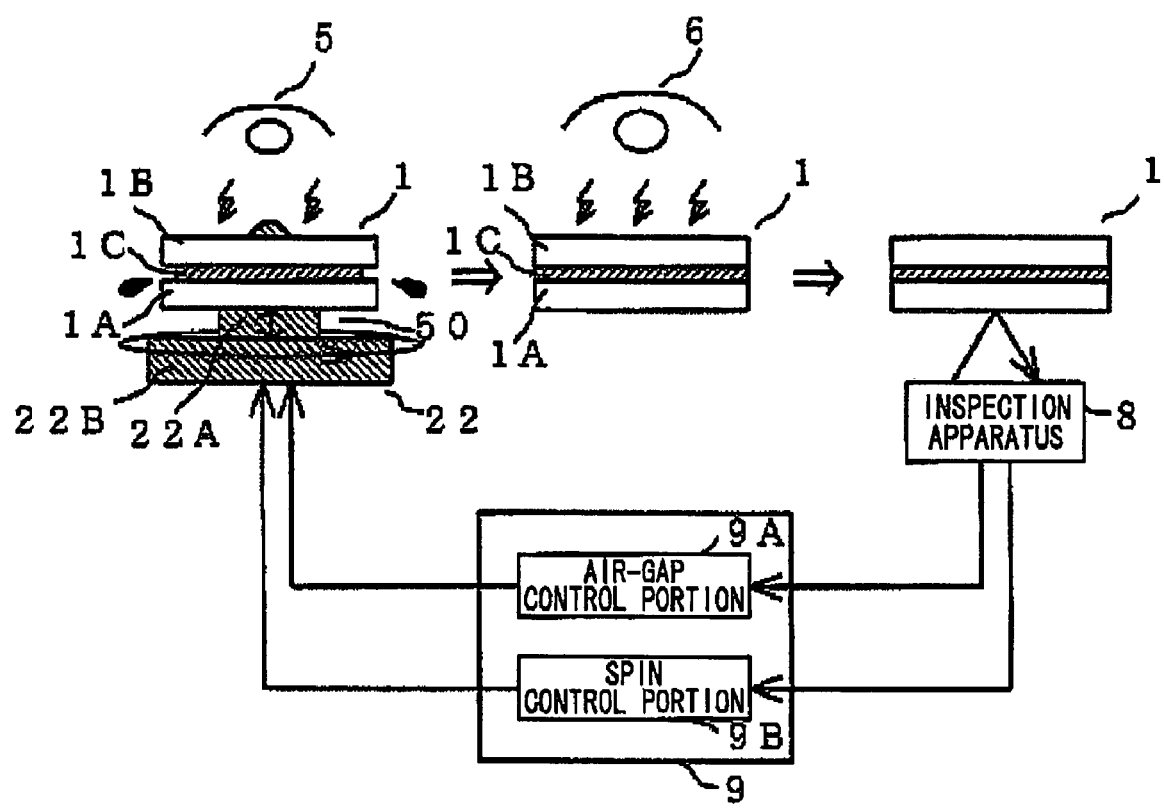
FIG. 5 is a drawing for explaining a control method of an air-gap or slit of a spinning apparatus.

In reference to FIG. 5, an example is explained in which a size of the air-gap is controlled or adjusted based on an amount of warp or curve "t" after radiating ultraviolet. In this embodiment, compared to the first embodiment shown in FIG. 2, both an inspection apparatus 8 and a turntable control apparatus 9 which is constituted from an air-gap control portion 9A and a spin control portion 9B are added. The ultraviolet radiation apparatus 5 conducts a first radiation operation of ultraviolet on the disc substrates 1A and 1B which are combined by using the adhesive 1C and are mounted on the turntable 22 while spinning at a high speed. Here, it is possible to set a size of the air-gap zero at a time of beginning of production, and it is possible to adjust the size of the air-gap based on inspection results of warp or curve obtained after producing a predetermined number of optical discs. The second ultraviolet radiation apparatus 6 conducts a second radiation operation of ultraviolet on the disc substrate 1 after the first radiation operation of ultraviolet in order to completely cure the adhesive. After curing the adhesive 1C, the inspection apparatus 8 measures warp and curve of the disc substrate 1 and conducts an inspection, and the air-gap control portion 9A and the spin control portion 9B input the measuring result of warp and curve. Here, if the adhesive 1C is completely cured by using the first ultraviolet radiation apparatus 5, it is possible to omit a curing operation by using the second ultraviolet radiation apparatus 6.

The air-gap control portion 9 calculates the most appropriate size of the air-gap between the a mounting surface of the inside diameter member 22A and the outside diameter member 22B based on the measured result of warp and curve, and outputs a command including a value to the upward/downward driving apparatus which is not shown in the drawings. The upward/downward driving apparatus controls or adjusts a height of the inside diameter member 22B of the turntable 22 via the upward/downward driving axis 7 in accordance with the command including the value. For example, a size of the air-gap is zero at a time of beginning of production, that is, a mounting surface of the inside diameter member 22A and the outside diameter member 22B are set at the same height, hence, based on the command including the value from the air-gap control portion 9, the upward/downward driving axis 7 is raised in order to raise the inside diameter member 22B so as to be the predetermined height. As is understood based on a relationship between the air-gap size L and the warp amount t shown in FIG. 3, if the spinning speed is constant, it is possible to obtain a large change with regard to the amount of warp or curve by applying a large value to the air-gap size L. Otherwise, at the beginning of production, it is preferable to measure the amount of warp in a variety of cases in which the air-gap size L is changed in order to calculate a formula of a relationship between the air-gap size L and the amount of warp t, and it is possible to produce the disc substrates based on the measured results.

The spin control portion 9B calculates a spinning speed of the turntable 22 based on the measured result of the amount of warp and outputs a command including the value to the spin driving apparatus 4. In accordance with the received command including the value, the spin driving apparatus 4 controls spinning of the turntable 22 via the spinning axis 3. It is possible to obtain a large change with regard to the amount of warp or curve by spinning faster. In this embodiment, based on data obtained by measuring the amount of warp of the optical discs produced via a series of production steps, it is possible to optimize the air-gap size and the spinning speed by an automatic control, and consequently, it is possible to conduct a control operation in order to reduce warp or curve or to control warp or curve so as to be a desired level with high accuracy without difficulties.

Third Embodiment

Figure 6:
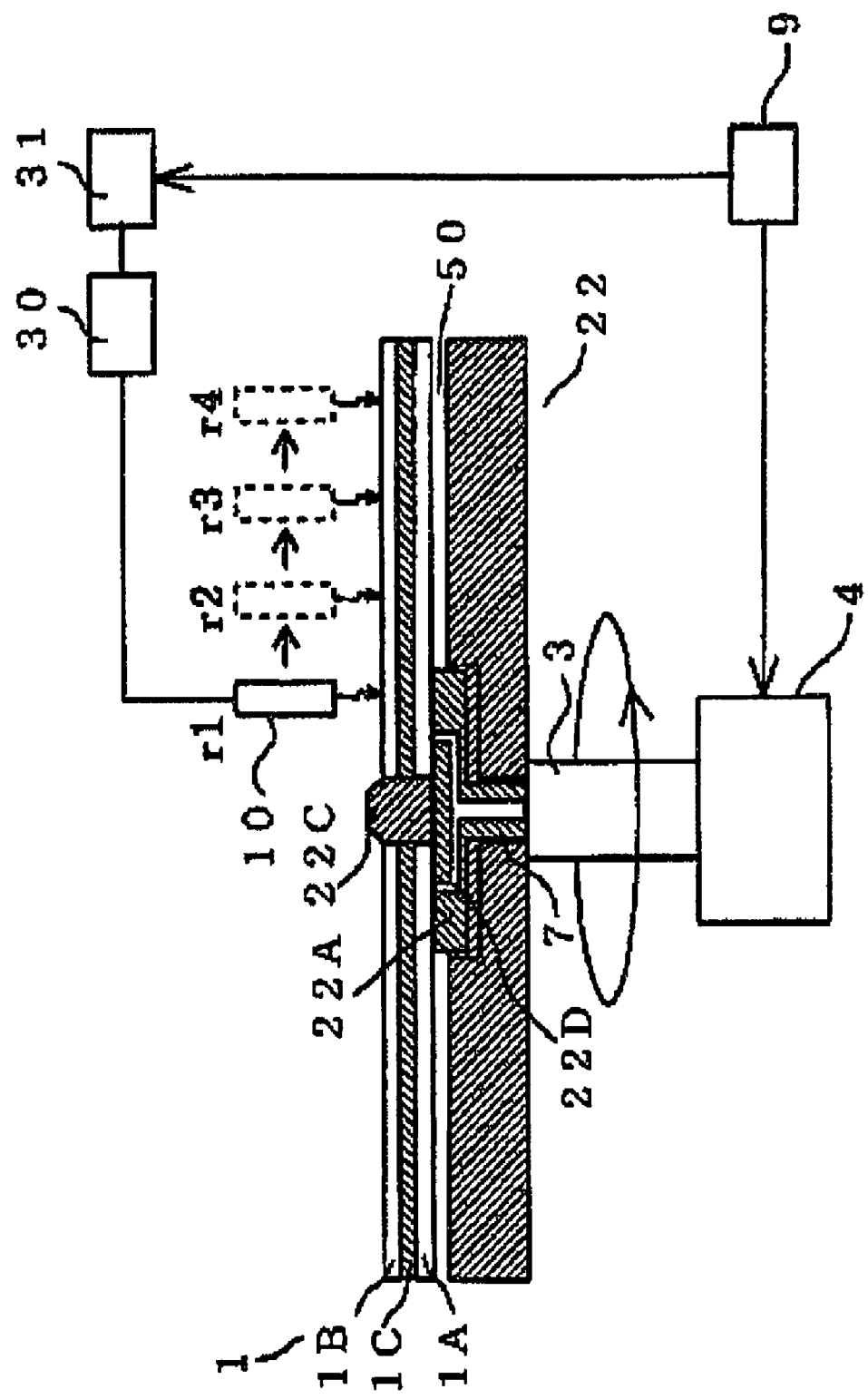
FIG. 6 is a drawing which explains the constitution of a spinning apparatus of a third embodiment of the present invention.

In reference to FIG. 6, a spinning apparatus 300 is explained which is another example of the first ultraviolet radiation method. It should be noted that explanations overlapping the spinning apparatus 100 shown in FIG. 1 or the spinning apparatus 200 shown in FIG. 4 are omitted. In FIG. 6, the disc substrate 1 constituted from the disc substrates 1A and 1B which are combined via the adhesive 1C is mounted on the inside diameter member 22A of the turntable 22 while a side of the disc substrate 1A of the disc substrate 1 faces downward. A spot ultraviolet radiation apparatus l is provided above the disc substrate 1 and radiates a spot of ultraviolet supplied from an ultraviolet source 30 on the adhesive 1c extended between the disc substrates 1A and 1B. A radiation control apparatus 31 controls turn on/off of ultraviolet, radiation time and radiation strength by controlling the ultraviolet source 30 and cooperates with the turntable control apparatus 9.

Figure 7:
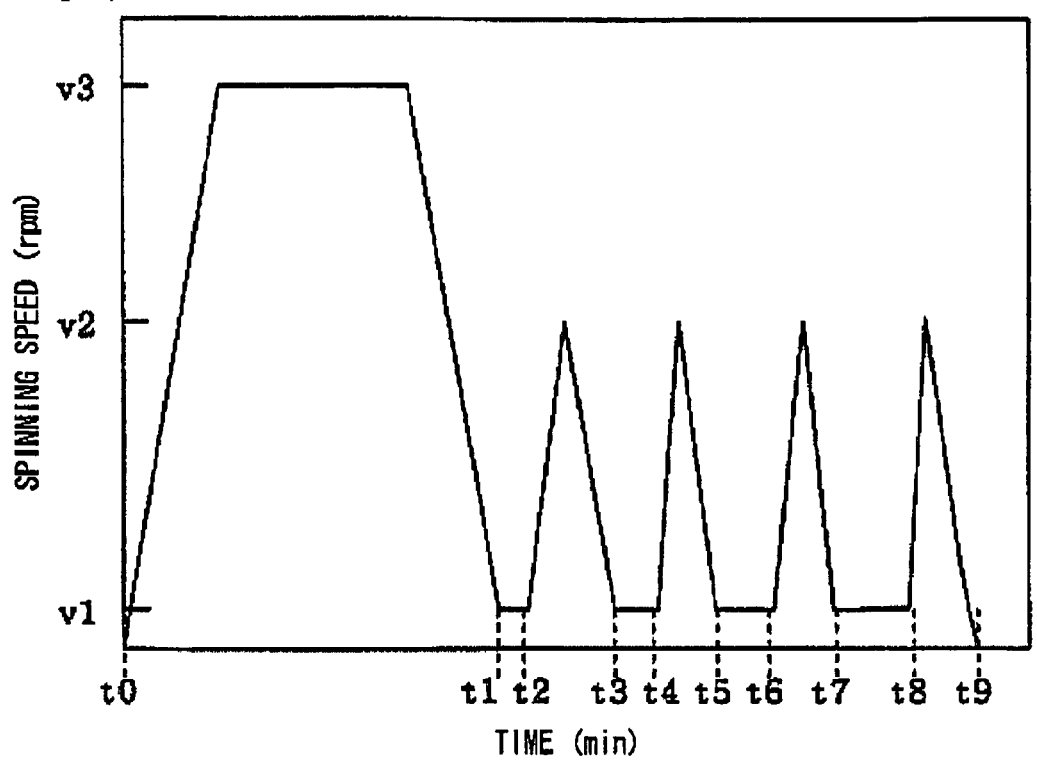
FIG. 7 is a graph explaining a spin program of a spinning apparatus.

Next, operations in this embodiment are explained in reference to a spin program shown in FIG. 7. A spinning operation is stated at a time to of the spinning program, and the spinning speed is increased so as to be v3. The adhesive 1c close to the center aperture of the disc substrates 1A/1B is extended in a radially outside direction due to a centrifugal force generated by spinning at a high speed. After spinning at a speed of v3 for a few seconds, the spinning speed is decreased so as to be v1. Here, by spinning at a high speed, a negative pressure is caused on a lower surface of the disc substrate 1A of the disc substrate 1, and a pulling force in a downward direction is applied on the combined disc substrates 1A/1B.

At a time t1 when the spinning speed is decreased to v1, ultraviolet supplied from the ultraviolet source 30 is radiated by using the spot ultraviolet radiation apparatus 10 which is arranged above an area of a radius r1 from an inside periphery of the disc substrate 1, and a radiation operation of ultraviolet is continued from the time t1 to t2 while spinning at a low spinning speed v1. The adhesive 1C of an area of the radius r1 from an inside periphery is extended by spinning at a high speed v3, a predetermined warp or curve is obtained, and in addition, a film of a predetermined thickness is obtained. In a curing operation, it is possible to semi-cure instead of completely curing. In the first spinning operation at a high speed, a distribution of thickness of a film is thick at an area outside the area of the radius r1 from the inside periphery. Here, from the high spinning speed, the spinning speed is reduced so as to be a low speed at which the adhesive 1C is not substantially extended, a centrifugal force affected on the adhesive 1C is reduced, and it is possible to reduce or eliminate the amount of the adhesive 1C that is extended in a radially outside direction while radiating ultraviolet. In addition, in a state in which a negative pressure is generated on a lower surface of the disc substrate 1A of the disc substrate 1, the adhesive 1C close to an area of the radius r1 is semi-cured or completely cured. The spinning speed v1 which is a low speed is, as a concrete example, 100-600 rpm.

Next, at a time t2, the spinning speed is increased from the low spinning speed v1 to a low spinning speed v2 which is lower than the spinning speed v3 in order to extend the adhesive 1C. In addition, at the time t2, a control apparatus not shown in the drawings controls the spot ultraviolet radiation apparatus 10 so as to move to a position corresponding to a radius r2 on the substrate. It is preferable that the spot ultraviolet radiation apparatus 10 move to the position r2 from a time t2-t3 while spinning at a high speed. The adhesive 1C spread on an area inside the radius r1 from the inside periphery of the disc substrate 1 is semi-cured or completely cured and is not extended because of no liquidity, hence, the film close to the radius r1 does not move, and the adhesive 1C outside the area of the radius r1 is extended. In this second spinning operation at a high speed, the thickness of the film outside the area of the radius r1 is reduced. After spinning at the spinning speed v2, the spinning speed is lowered so as to be v1.

A radiation operation of ultraviolet on the adhesive 1C spread on an area of the radius r2 is conducted in order to semi-cure by the spot ultraviolet radiation apparatus 10 from the time t3 to t4 while spinning at a low spinning speed v1, and a predetermined and temporally fixed state is obtained while obtaining a predetermined film thickness. In addition, in a state in which a negative pressure is applied on a lower surface of the disc substrate 1A of the disc substrate 1, the adhesive 1C close to an area of the radius r2 is semi-cured or completely cured. On the disc substrate 1, a circumference is longer if closer to the outside periphery compared to the inside periphery, hence, if the time t3-t4 is longer than the time t1-t2, it is possible to effectively cure the adhesive 1C spread overall circumference of the radius r2. After the time t4, in accordance with such a manner in which operations of a high speed spinning and low speed spinning are repeatedly conducted, the adhesive 1C is extended so as to be a predetermined thickness when spinning at a high speed, and the adhesive 1C is cured by radiating ultraviolet when spinning at a low speed.

Figure 9:
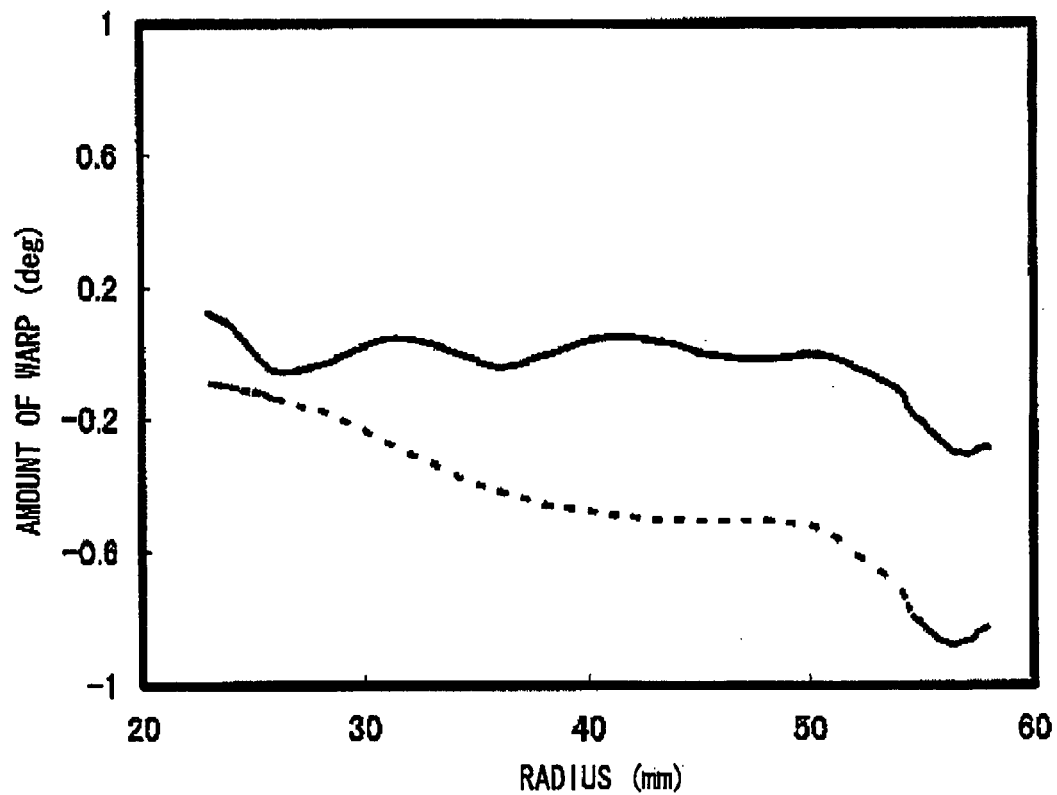
FIG. 9 is a graph showing both a radius of a disc substrate and amount of warp or curve obtained in accordance with both a conventional method and a method of the present invention.

FIG. 9 is a graph showing the amount of warp or curve along a direction of a radius of the disc substrate 1. A solid line shows the amount of warp or curve along a direction of a radius in this embodiment, and a broken line shows a case of a conventional technique. As a comparison result, the amount of warp or curve of the conventional technique has a difference between the maximum value and the minimum value that is approximately 0.8 deg, and the amount of warp or curve of this embodiment has a difference between the maximum value and the minimum value that is approximately 0.4 deg, hence, a reduction of warp or curve of 0.4 deg is recognized compared to the conventional technique. In a constitution of this embodiment, an air-gap 50 is provided between a lower surface of the disc substrate 1A of the combined disc substrates 1A/1B and the outside diameter member 22B of the turntable 22, and the adhesive 1C is semi-cured or completely cured gradually from the inside periphery to the outside periphery while spinning, hence, it is possible to control not only amount of warp or curve, but also the film thickness so as to be uniform.

Figure 8:
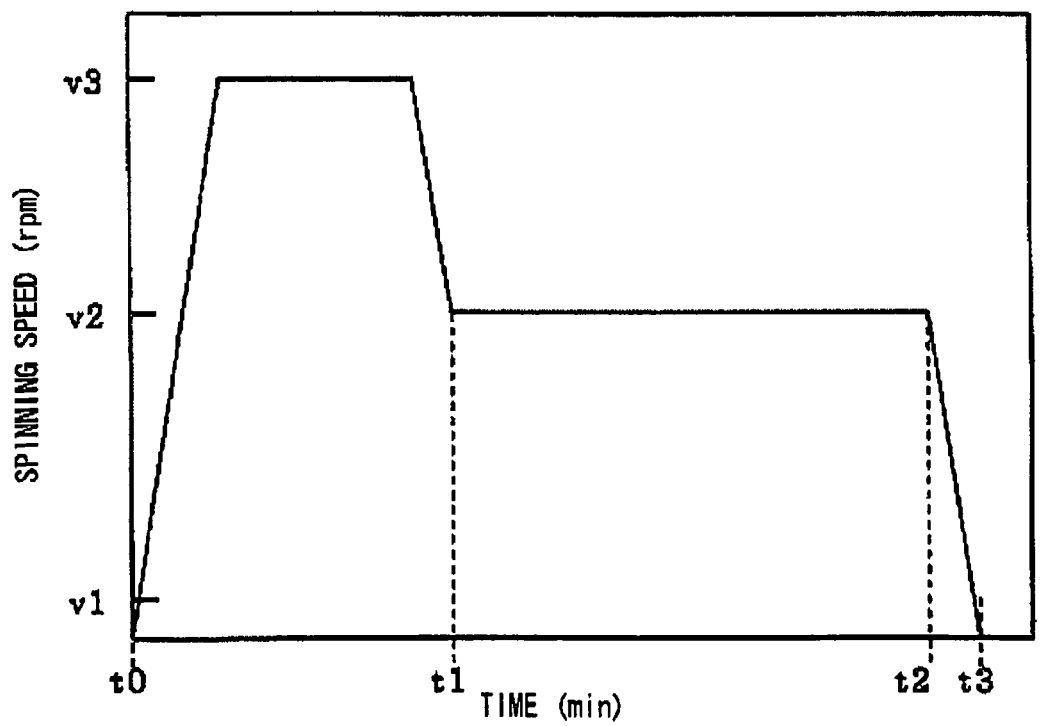
FIG. 8 is a graph explaining another spin program of a spinning apparatus.

Here, in the spin program shown in FIG. 7, it is possible to control both the amount of warp or curve and the film thickness by adjusting the spinning speed while spinning at a low speed. For example, if only the spinning speed at the time t7-t8 is adjusted by partially increasing/decreasing, it is possible to partially control the amount of warp or curve at an area close to the radius r4 which is an outside periphery of the disc substrate 1. In addition, as shown in a spin program of FIG. 8, after the time t0-t1 of spinning at a high speed, it is preferable to keep the spinning speed so as to be a fixed low spinning speed v2 at the time t1-t2 and to partially radiate ultraviolet from the inside to the outside. Likewise, in such a case, it is possible to control both the amount of warp and thickness.

Fourth Embodiment

Figure 10:
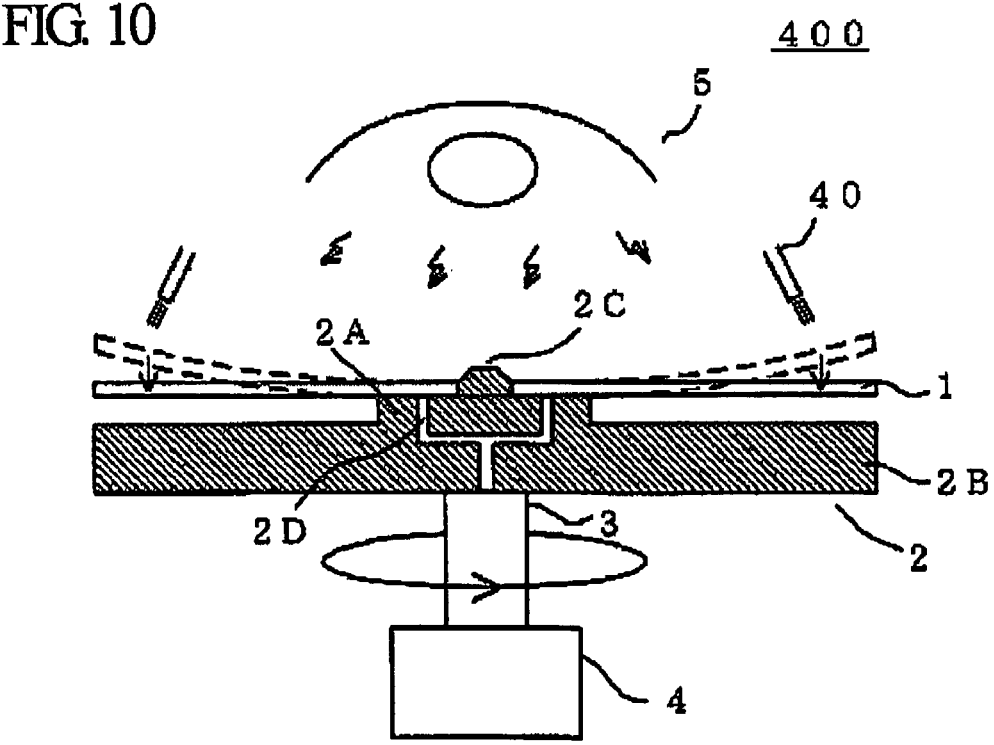
FIG. 10 is a drawing which explains the constitution of a spinning apparatus of a fourth embodiment of the present invention.

In reference to FIG. 10, a spinning apparatus 400 is explained which is another example of the first ultraviolet radiation method. It should be noted that explanations overlapping the spinning apparatus 100 shown in FIG. 1 or the spinning apparatus 200 shown in FIG. 5 are omitted. Compared to the first and second embodiments, this embodiment has a different point in which a gas discharging unit 40 is provided which discharges gas on the disc substrate 1B of the disc substrates 1A/1B mounted on the turntable 2. In order to reduce or control the warp or curve so as to be a desired or predetermined value by applying a pressure on the outside periphery portion of the disc substrate 1B while spinning, the gas discharging unit 40 is provided in a manner in which the gas is discharged so as to generate a gas flow in a direction toward an outside periphery of the disc substrate 1B. In this embodiment, a pressure is applied on the disc substrates 1A/1B by the gas flow, hence, it is possible to reduce an influence of a negative pressure by setting a size of the air-gap between the disc substrate 1A and the outside diameter member 2B so as to be small. It is necessary to optimize a velocity of gas flow in order to adjust the pressure so as to avoid the disc substrates 1A/1B from fluttering while spinning. It is possible to provide multiple gas charging units 40 at several positions above the disc substrate 1B in order to apply uniform pressure on the disc substrates 1A/1B.

Figure 11:
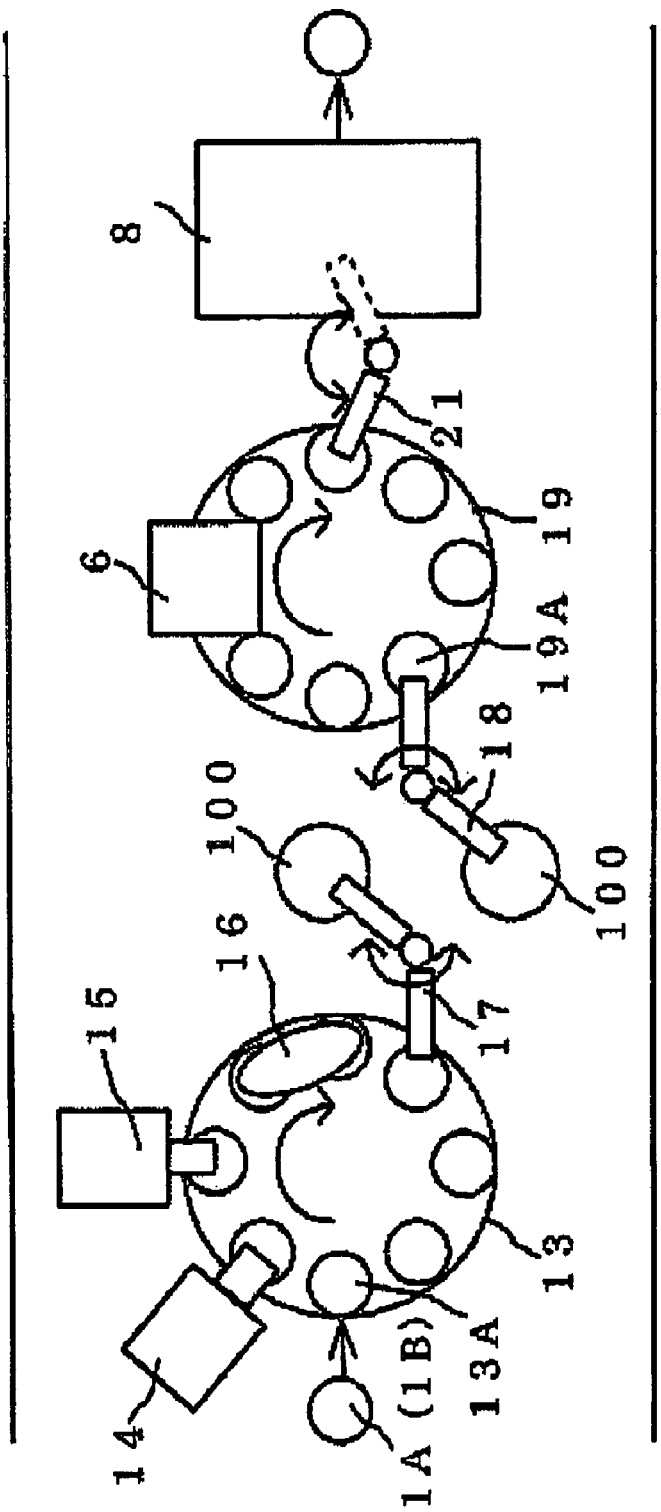
FIG. 11 is a drawing explaining the constitution of an optical disc production apparatus.

In reference to FIG. 11, an optical disc production apparatus 500 of this embodiment is explained. After mounting the disc substrate 1A or 1B on a mounting portion 13 of a turntable 13, only the disc substrate 1B is turned over by a turn over apparatus 14 in order to face a surface on which another disc substrate is combined. The disc substrate 1A is not turned over and transported to just below a resin supplying apparatus 15 in order to supply a resin. Next, a combining apparatus 16 combines the disc substrate 1B and the disc substrate 1A on which the adhesive 1C is supplied.

The combined disc substrates 1A/1B are transported to the spinning apparatus 100 by a transport arm 17. In this embodiment, in order to save on production time, a pair of the spinning apparatuses 100 are operated in parallel. The spinning apparatus 100 provides both the turntable 2 and the first ultraviolet radiation apparatus 5 above the turntable 2, an air-gap is provided between a lower surface of the combined disc substrates 1A/1B and outside diameter member 2B of the turntable 2, and the adhesive 1C is semi-cured or completely cured while spinning. Here, it is possible to use the spinning apparatus 200 or 300 instead of the spinning apparatus 100. In addition, if multiple spinning apparatuses are used in parallel, it is possible to save more on production time.

The disc substrates 1A/1B including the adhesive 1C which is semi-cured or completely cured are taken out by the transport arm 18 from a pair of spinning apparatuses 100 by turns and mounted on a turntable 19 of a mounting portion 19A. The second ultraviolet radiation apparatus 6 is provided above a portion of spinning tracks of the turntable 19, and the adhesive 1C is completely cured when the combined disc substrates 1A/1B pass through the second ultraviolet radiation apparatus 6. After a second ultraviolet radiation operation, the combined disc substrates 1A/1B are transported to an inspection apparatus 8 by the transport arm 21 in order to inspect for such as warp and a state of the film.

Fifth Embodiment

FIG. 12 shows an embodiment of forming a film such as a protective film. In this embodiment, a resin 11C is put on a first disc substrate 11A (hereinafter, disc substrate 11A) while spinning a nozzle 7 or the disc substrate 11A (st1). The resin 11C is for example, a protective film forming material which is an ultraviolet curing material used for forming a protective film. After forming the resin 11C, the disc substrate 11A is transported to the turntable 2 and mounted on the inside diameter member 2A so as to have a direction of warp which forms a dipping curve. Warp or curve of the disc substrate 11A is caused because of such as forming conditions of the disc substrate 11A, conditions of transporting, and the like, and a direction of warp or curve of the disc substrate 11A appears almost the same every time if no condition is changed such as forming conditions of the disc substrate 11A, conditions of transporting, and the like. In view of such cases, it is possible to arrange the disc substrate 11A beforehand so as to have a direction of warp which forms a dipping curve when being mounted on the inside diameter member 2A of the turntable 2. In addition, it is possible to detect a direction of warp or curve before mounting on the turntable 2 and turn over the disc substrate 11A if necessary.

The turntable 2 is the same as the first embodiment, the outside diameter member 2B has a larger diameter than the inside diameter member 2A, and when the disc substrate 11A is mounted on the inside diameter member 2A, an air-gap 50 is formed between a portion of the disc substrate 11A. In such a state, the disc substrate 11A mounted on the turntable 2 to which the spin driving apparatus 4 is connected via the spinning axis 3 is spun at a high speed (st2). By spinning the disc substrate 11A at a high speed, the resin 11C is extended in a direction from an inside periphery to an outside periphery. Here, when the disc substrate 11A is spun at a high speed, a negative pressure is generated under a portion of a surface of the disc substrate 11A that is not mounted, and a force is generated that pulls the disc substrate downward. It is possible to control such a negative pressure based on a size of the air-gap, a spinning speed, and the like. On the disc substrate 11A, a negative pressure causes a force in an opposite direction compared to a direction of warp or curve, and consequently, it is possible to control the warp or curve so as to be at a desired or predetermined level by setting a size of the air-gap or a spinning speed to a predetermined value.

Next, in a state in which a downward force is being applied to the disc substrate 11A while spinning at a high speed, the first ultraviolet radiation apparatus 5 radiates ultraviolet on the disc substrate 11A from an upward position, and the adhesive 11C is semi-cured or completely cured. It is possible to radiate ultraviolet on only a portion of the resin 11C close to the center aperture or overall surface of the disc substrate 11A.

The second ultraviolet radiation apparatus 6 radiates ultraviolet on an overall surface of the disc substrate 11A which has less warp or warp of a desired level, and the resin 11C is completely cured (st3). It should be noted that if the adhesive 11C has been completely cured by the first ultraviolet radiation apparatus 5 in Step st2, it is possible to omit radiation of ultraviolet of the second radiation step of Step st3. It is possible to use a small size apparatus as the second ultraviolet radiation apparatus 6 or omit the second ultraviolet radiation apparatus 6 because the first ultraviolet radiation apparatus is provided, and consequently, it is possible to achieve a smaller production apparatus as a whole.

In addition, it is possible to apply constitutions described in the second-fourth embodiments to the fifth embodiment in which a film such as a protection film is formed. In such a case, it is possible to obtain the above-described advantages by replacing the disc substrate 1 which is obtained by combining the disc substrates with the disc substrate 11A which is a single substrate.

In these embodiments, it is possible to apply a constitution in which one or more thin platy members are combined to the inside diameter member 2A/22A of the turntable 2/22 so as to form the air-gap 50 between a lower surface of a portion of the disc substrate 1 that is not mounted and the outside diameter member 2B/22B. In such a case, it is possible to adjust a size of the air-gap by increasing or decreasing a number of the thin platy members, and consequently it is possible to control warp or curve so as to be a desired value by applying a simple constitution. It is preferable to provide apertures on the thin platy members at positions corresponding to the pin shape member 2C and the suction apertures 2D. Here, the thin platy member is made from materials such as metal, resin, paper, and the like, and can be a shape of a sheet.

In addition, in these embodiments, a size of the air-gap is adjusted by changing a height of the inside diameter member 2A/22A of the turntable 2/22. In order to adjust a size of the air-gap, it is preferable that the inside diameter member 2A/22A have a predetermined height, and one or multiple platy members be provided on an area of the outside diameter member 2B/22B on which the disc substrate is not directly mounted while excluding the inside diameter member 2A/22A. In such a case, it is possible to control warp or curve so as to be a desired value by applying a simple constitution.

In a case shown in FIG. 3, by setting a size of the air-gap so as to be 0.2 mm or smaller and larger than 0 mm, it is possible to control an amount t of warp or curve so as to be in a range smaller than 0.2 (deg).

In addition, in a case shown in FIG. 3, if it is necessary to obtain the amount t of warp or curve after radiating ultraviolet that is a predetermined value larger than zero, by appropriately adjusting the air-gap size L based on the predetermined value in reference to the graph of FIG. 3, it is possible to obtain an optical disc which has the desired amount t of warp or curve after radiating ultraviolet. There are cases in which it is necessary to obtain the predetermined amount t of warp or curve after radiating ultraviolet that is a predetermined value, that is, for example, it is prepared to print a label on the optical disc. In other words, in such a case, by taking account of the amount of warp or curve that is caused by printing the label on a surface of the disc substrate, the amount of warp or curve is adjusted so as to be cancelled, and the optical disc is finally obtained without warp or curve.

As described above, a negative pressure is generated by spinning the disc substrate in a state in which the air-gap 50 is provided. This is supposed to be a theory in that the air of the air-gap 50 is spun while the disc substrate is spinning, a centrifugal force is generated because of spin of the disc substrate, an air pressure of the air-gap 50 is decreased while the disc substrate is spinning, and consequently, the negative pressure is generated.

In the above-described embodiments, for example, the spinning apparatus 100 of FIG. 1 spins the disc substrate 1 which is obtained by combining a pair of the disc substrates via the resin which is the adhesive. However, it is possible to apply the present invention not only for extending or curing the adhesive or the resin, but also for extending or curing various liquids other than the resin. Otherwise, it is possible to apply the present invention to a case of supplying no liquid material such as described above. In addition the present invention is not limited to a case of a pair of the disc substrates, and it is possible to use more disc substrates.

INDUSTRIAL APPLICABILITY

In accordance with a production method of an optical disc of the present invention, it is possible to provide an optical disc which has a desired warp or curve (tilt angle).

The invention claimed is:

1. An optical disc production method comprising the steps of:
   mounting a portion of a disc substrate on a turntable while maintaining an air-gap between an outside diameter portion of the turntable and a portion of the disc substrate that is not mounted on the inside diameter portion after supplying liquid material on the disc substrate;
   spinning the first disc substrate in order to spread the liquid material; and
   semi-curing or completely curing the liquid material while spinning the first disc substrate, wherein
   a warp of the first disc substrate is controlled by adjusting a size of the air-gap.

2. An optical disc production method according to claim 1, wherein a warp of the first disc substrate is controlled by adjusting a spinning speed of the turntable.

3. An optical disc production method according to claim 1, further comprising the steps of measuring a warp of the disc substrate after curing the liquid material, wherein a size of the air-gap is adjusted based on a measured result of the warp.

4. An optical disc production method according to claim 1, further comprising the steps of measuring a warp of the disc substrate after curing the liquid material, wherein a spinning speed of the turntable is adjusted based on a measured result of the warp.

* * * * *

UNITED STATES PATENT AND TRADEMARK OFFICE
CERTIFICATE OF CORRECTION

| | | |
|---|---|---|
| PATENT NO. | : 7,842,202 B2 | Page 1 of 1 |
| APPLICATION NO. | : 12/087232 | |
| DATED | : November 30, 2010 | |
| INVENTOR(S) | : Naoto Ozawa et al. | |

It is certified that error appears in the above-identified patent and that said Letters Patent is hereby corrected as shown below:

On the Title Pg, Item (73), change from "Assignee: Origin Electric Company Limited" to --Assignee: Origin Electric Company, Limited--.

Signed and Sealed this
Eighth Day of February, 2011

David J. Kappos
*Director of the United States Patent and Trademark Office*